United States Patent [19]

Shimano

[11] Patent Number: 4,608,878
[45] Date of Patent: Sep. 2, 1986

[54] REDUCED-WEIGHT GEAR CRANK

[75] Inventor: Keizo Shimano, Sakai, Japan

[73] Assignee: Shimano Industrial Company Limited, Osaka, Japan

[21] Appl. No.: 739,754

[22] Filed: May 31, 1985

Related U.S. Application Data

[63] Continuation of Ser. No. 291,574, Aug. 10, 1981, abandoned.

[30] Foreign Application Priority Data

Aug. 18, 1980 [JP] Japan .............................. 55-117846[U]
Aug. 18, 1980 [JP] Japan .............................. 55-117847[U]
Dec. 28, 1980 [JP] Japan .............................. 55-188831[U]

[51] Int. Cl.$^4$ .............................................. G05G 1/14
[52] U.S. Cl. ..................................... 74/594.2; 474/152
[58] Field of Search ............ 74/594.2; 474/152, 97–99, 474/902, 195, 141, 164

[56] References Cited

U.S. PATENT DOCUMENTS 3,550,465 12/1970 Maeda .................................. 474/151
4,009,621 3/1977 Segawa ................................ 474/160
4,144,773 3/1979 Addicks ............................... 474/161
4,358,967 11/1982 Kastan ................................ 74/594.2

FOREIGN PATENT DOCUMENTS 0002964 11/1979 European Pat. Off. .
0002903 11/1979 European Pat. Off. .
380950 12/1907 France ................................ 74/594.2
2337074 7/1977 France .
478547 2/1953 Italy ................................... 74/594.2
2042 of 1903 United Kingdom ............... 74/594.2

Primary Examiner—James A. Leppink
Assistant Examiner—Frank McKenzie
Attorney, Agent, or Firm—Stevens, Davis, Miller & Mosher

[57] ABSTRACT

A gear crank comprising a crank having a pair of crank arms and an adapter having a chain gear, the adapter being provided with two groups of each two stays, the stays in each group being positioned at the rear side in the drive-revolving direction of each crank arm and in a range in which the respective crank arms are subjected to the maximum torque.

7 Claims, 7 Drawing Figures

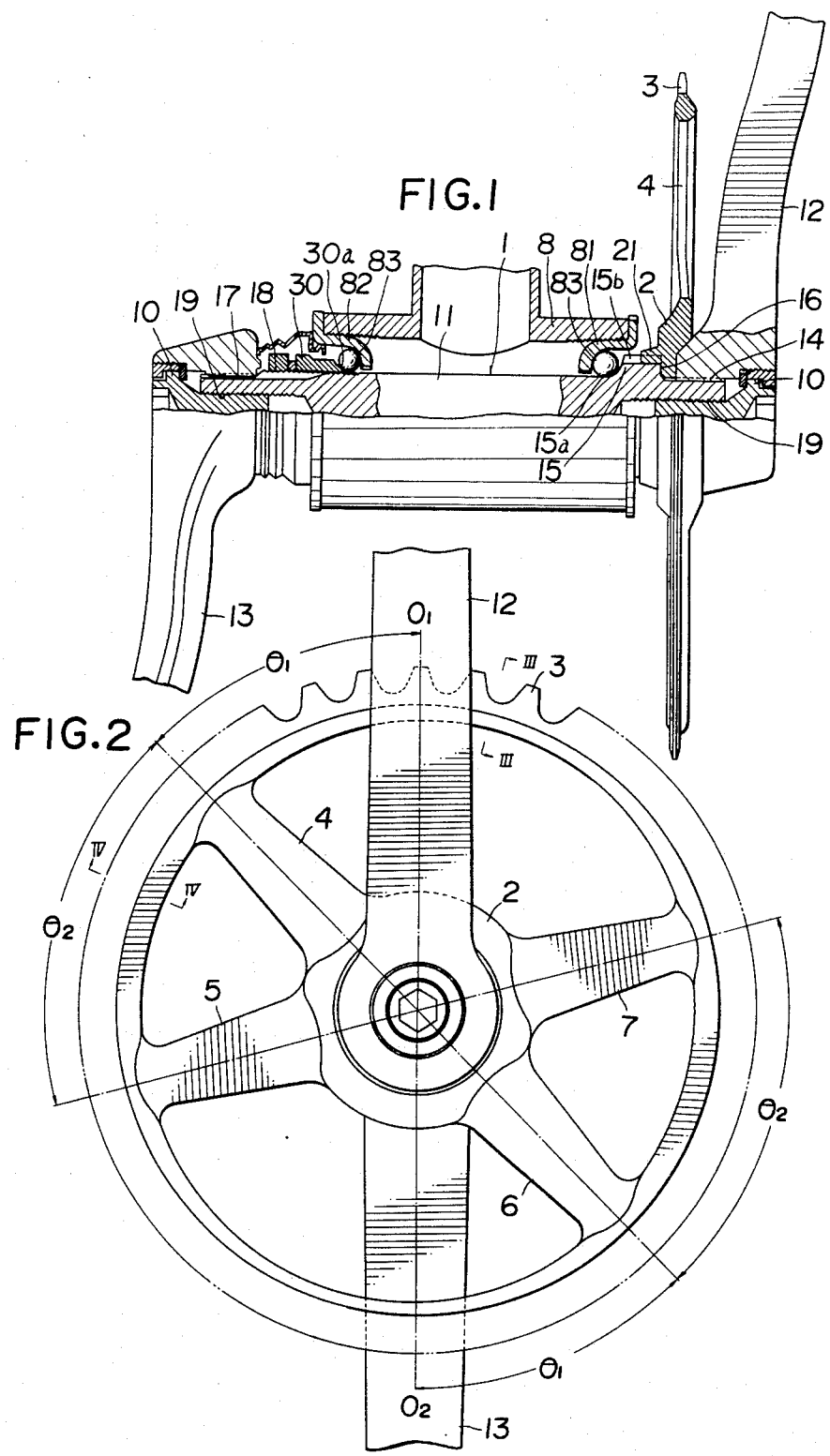

REDUCED-WEIGHT GEAR CRANK

This application is a continuation of application Ser. No. 291,574, filed Aug. 10, 1981 now abandoned.

FIELD OF THE INVENTION

This invention relates to a gear crank used mainly for a bicycle, and more particularly to a gear crank comprising a crank having a crank shaft and a pair of crank arms fixed to both axial ends of the crank shaft, and an adapter supporting an annular chain gear.

BACKGROUND OF THE INVENTION

A chain gear is usually made annular, has at its outer periphery a number of teeth, and is connected to a crank through an adapter, so that a torque from pedalling is transmitted from the crank to the chain gear through stays of the adapter.

The adapter has five stays disposed at about equal intervals circumferentially of the chain gear. The chain gear is supported to the stays and as a whole has a cross-sectional area greater than a minimum standard area which is required to withstand the maximum torque acting on the crank arms, thereby preventing a breakdown of the chain gear. In other words, the chain gear usually has five or more stays and the greater than minimum cross-sectional area because it has generally been considered that less than five stays and a reduced cross-sectional area of the chain gear are undesirable from the standpoint of strength. Therefore, a problem is created that the gear crank as a whole has an increased weight.

A bottom bracket at the bicycle frame supports a seat tube, a down tube, and a chain stay as well as the gear crank and extends at one axial end axially outwardly from the mounting portion for both the tubes so as to carry the gear crank. Therefore, during the bicycle's running, air flows to strike the front side of the axial end of the bottom bracket at the chain gear side to thereby cause an eddy flow in a space surrounded by the front side, down tube, and chain gear, the eddy flow creating a large air resistance against the bicycle's running. This not only deteriorates the running quality of the bicycle at high speed, but also increases driver fatigue.

SUMMARY OF THE INVENTION

An object of the invention is to provide a gear crank capable of withstanding the maximum torque acting on the crank arms, that is a gear crank which will not break, even though the number of stays is reduced or the chain gear as a whole has a cross-sectional area smaller than the minimum standard area.

Another object of the invention is to provide a gear crank which reduces an air resistance against the bicycle's running in such a manner that an air eddy flow, which is created in a space surrounded by the front side of one axial end of a bottom bracket at the chain gear side, a down tube, and the chain gear, escapes from the space axially outwardly of the chain gear.

The inventor has noted that a torque acting on each crank arm during its full revolution by pedalling, decreases to a minimum at the upper and lower dead points of each crank arm and increases to about a maximum when each crank arm revolves by an angle of 70° to 90° degrees from the upper dead point. The present invention was devised to utilize this torque characteristic. A first characteristic of the invention is that an adapter supporting the annular chain gear has two groups of stays each having two stays, each group of stays being positioned at the rear side of each crank arm in the drive-revolving direction thereof and in a range wherein each crank arm in revolution, after passing the upper dead point, is subjected to the maximum torque.

A second characteristic of the invention is that the chain gear is made smaller in a cross-sectional area at a portion corresponding to each crank arm than a portion corresponding to each stay.

A third characteristic of the invention is that each stay is twisted with respect to the general plane of the chain gear, so that the front side of each stay in the drive-revolving direction of the chain gear is displaced away from the crank arm at the chain gear supporting side and the rear side of each stay in the same direction is displaced toward the same crank arm.

Accordingly, this invention makes it possible to subject each group of two stays to a torque in a range wherein each crank arm is subjected to the maximum torque. Also, the smaller cross-sectional area portion of the chain gear is subjected to a reduced torque from the maximum, thereby reliably preventing a breakdown of the chain gear without deteriorating the strength of the stay for supporting the chain gear, while the gear crank as a whole has a decreased weight.

Furthermore, when the chain gear is revolving to drive the bicycle, an air flow is created which passes through the chain gear axially outwardly thereof along the slant surface of the stay from the front side thereof in the drive-revolving direction of the chain gear. This air flow introduces an eddy flow in a space surrounded by the front side of one axial end of the bottom bracket, the down tube, and the chain gear, thereby allowing the air to escape from the space. As a result, air resistance against the gear crank can be reduced.

These and other objects of the invention will become more apparent in the detailed description and and examples which follow.

BRIEF DESCRIPTION OF THE DRAWINGS

FIG. 1 is a partially cutaway front view of an embodiment of a gear crank of the invention, FIG. 2 is a side view of the FIG. 1 embodiment.

DETAILED DESCRIPTION OF THE INVENTION

Figures 3, 4:
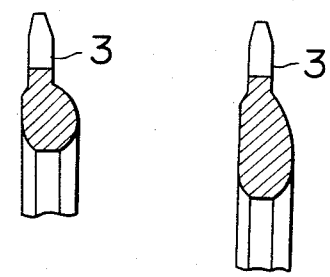
FIGS. 3 and 4 are enlarged sectional views taken on the lines III—III and IV—IV in FIG. 2.

A gear crank of the invention, as shown in FIG. 1, comprises a crank 1, an adapter 2, and an annular chain gear 3 supported thereto, the crank 1 comprising a crank shaft 11 and a pair of crank arms 12 and 13 fixed to both axial ends thereof. The crank shaft 11 is provided at the outer periphery of its one axial end with a fitting portion 14 tapered outwardly and having a number of splines and with a larger diameter portion 15 having a ball race 15a. A stepped portion 16 is also provided between the fitting portion 14 and the larger diameter portion 15. At the outer periphery of the other axial end of crank shaft 11 a tapered fitting portion 17 is provided having a number of splines and a screw thread 18. The crank arms 12 and 13 are fitted onto the fitting portions 14 and 17 respectively of crank shaft 11. A ball holder 30 having a ball race 30a is screwed with the screw thread 18, and the crank shaft 11 is provided at the center of its end faces with threaded bores 19, with which headed bolts 10 are screwed to support the crank arms 12 and 13 not-rotatably with respect to the crank shaft 11. The larger diameter portion 15 is provided at its outer periphery with a number of splines 15b on which the adapter 2 is mounted.

The adapter 2 has at the outer periphery of its boss four stays 4, 5, 6 and 7, through which the annular chain gear 3 is mounted integrally on the adapter 2, and is provided in the vicinity of the boss with a fitting portion 21 having a number of splines engageable with the splines 15b, so that the fitting portion 21 is fitted onto the splines 15b not-rotatably with respect to the crank shaft 11. The boss of adapter 2 is fixedly sandwiched between the stepped portion 16 and the crank arm 12 inserted into the fitting portion 14, so that a torque created by pedalling is transmitted to the chain gear 3 through the crank arms 12 and 13, crank shaft 11, and each stay 4, 5, 6 or 7 of adapter 2.

Referring to FIGS. 2, one group of two stays 4 and 5 and the other group of two stays 6 and 7, are disposed corresponding to the rearwardly of the crank arms 12 and 13, the stays 4 and 6 being disposed near the crank arms 12 and 13 and at angles $\theta_1$ of 40 to 60 degrees therefrom or from upper dead point $O_1$ and lower dead point $O_2$ as shown, respectively. The stays 5 and 7 are disposed at angles $\theta_2$ of 50 to 70 degrees, and preferably to 60 degrees, to the stays 4 and 6 respectively. Hence, the stays 4 and 5, or 6 and 7 in each group corresponding to each pedaled crank arm 12 or 13 are positioned in a range wherein each crank arm 12 or 13, after passing the upper dead point $O_1$, is subjected to the maximum torque.

The chain gear 3 is molded to be integral with the adapter 2 and stays 4 to 7. The inner diameter of the chain gear 3 body except for connecting portions with the stays 4 to 7 is made larger between the position corresponding to each stay 12 or 13 and the position at an angle of 20° to each stay 12 or 13 than between the stays 4 and 5 or those 6 and 7, so that each portion of a larger inner diameter is made smaller in a cross-sectional area than that between the stays 4 and 5 or 6 and 7, thus making the chain gear 3 lightweight. Alternatively, the chain gear 3 may, instead having an enlarged inner diameter as above, be reduced in its axial thickness to be lightweight.

In addition, in FIG. 1, reference numeral 8 designates a bottom bracket, and 81 and 82 designate cups screwed with both axial ends of bottom bracket 8, the crank 1 being supported rotatably to the bottom bracket 8 through balls 83 interposed between the ball races at the cups 81 and 82 and the ball race 15a of crank shaft 11 and ball race 30a of ball holder 30.

In the gear crank constructed as described above, when the crank arm 12 is positioned at the upper dead point and crank arm 13 is positioned at the lower dead point during the pedalling, the portions of smaller cross-sectional area at the chain gear 3 are positioned in ranges including the upper and lower dead points of crank arms 12 and 13, wherein the crank arms 12 and 13 are subjected to a smaller torque and the portions of larger cross-sectional area are positioned in ranges in which the dead points are not included and the torque is larger.

One crank arm 12, when pedaled for driving the bicycle, passes the upper dead point $O_1$ to forwardly revolve at an angle of 40 to 60 degrees to the upper dead point $O_1$, then the stay 4 in one group corresponding to crank arm 12, near the crank arm 12, is positioned at the upper dead point $O_1$. When the crank arm 12 further revolves forwardly to be shifted at an angle of 90 to 130 degrees with respect to the upper dead point $O_1$, the stay 5 away from the crank arm 12 is positioned at the upper dead point $O_1$. The stays 6 and 7 in the other group corresponding to the other crank arm 13 move to be positioned in the same manner as the above following the revolution of the crank arm 13.

Figure 7:
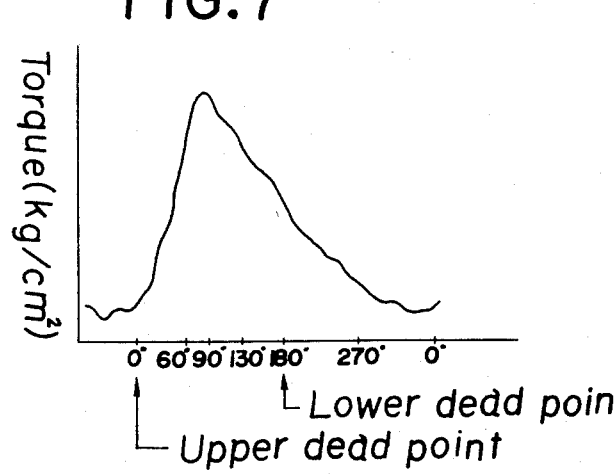
FIG. 7 is a view explanatory of a relation between a rotary angle of the crank arm and a torque acting thereon.

As seen from FIG. 7, each grouup of stays 4 and 5 or 6 and 7 is positioned in a range wherein each crank arm 12 or 13 is subjected to the maximum torque. Hence, the increasing torque in the above range is allowed to act on the portion larger in a cross-sectional area at the chain gear 3 through the stays 4 and 5 or 6 and 7 in each group positioned within the range. Thus, even when the chain gear 3 uses four stays or has a reduced cross-sectional area at the portion corresponding to each crank arm 12 or 13, there is no fear of a breakdown of the chain gear 3, and the gear crank can be made lightweight.

Figure 5:
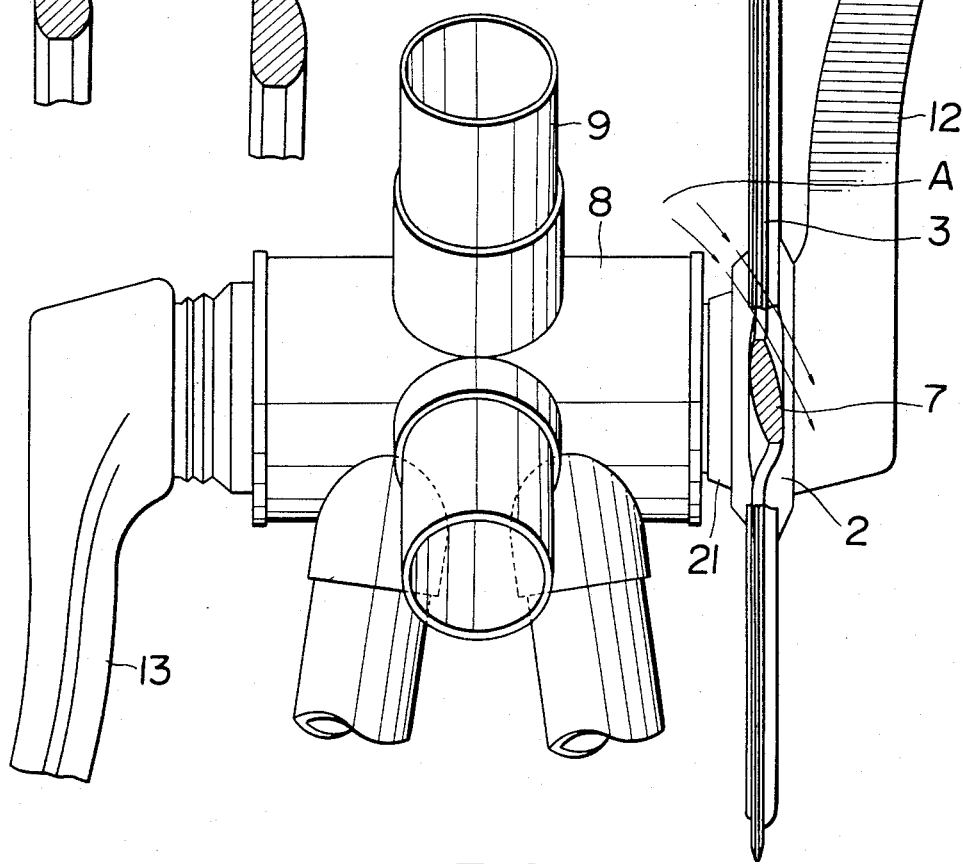
FIG. 5 is a partially cutaway plan view of the FIG. 1 embodiment.

In the gear crank shown in FIG. 5, the respective stays 4 to 7 are made oblong in cross section with opposite long sides and opposite short sides having a circular arc. The stays are tapered endwise at the front and rear portions in the drive-revolving direction of the chain gear 3, the long sides being oriented in parallel to the same direction. The stays 4 to 7 formed as just described are twisted with respect to the general plane of chain gear 3 so that the front side of each stay 4, 5, 6 or 7 is displaced away from the crank arm 12 at the chain gear 3 supporting side and the rear side is displaced toward the crank arm 12. Hence, an air flow striking the front of each stay 4, 5, 6 or 7, during revolution of the crank arms 12 and 13, is guided along the slant surface of each stay axially outwardly of the chain gear 3, whereby it passes through the chain gear 3 and escapes axially slantwise outwardly thereof. As a result, no eddy flow is created in a space A surrounded by the front of the axial end of bottom bracket 8 at the chain gear 3 side, down tube 9 and chain gear 3.

Therefore, the air escapes from the space A axially outwardly of the chain gear 3 through the slanted stays as above-mentioned, so that the air resistance against the gear crank is reduced to thereby improve the high speed running quality of the bicycle.

Figure 6:
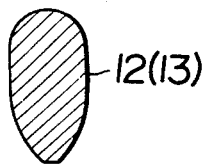
FIG. 6 is a sectional view of a crank arm.

Referring to FIG. 6, the crank arms 12 and 13 are made streamlined in cross section in such a manner that the front side, in the drive revolving direction of the same, is round and both sides in continuation of the front are gently rearwardly tapered, thereby further reducing the air resistance against revolution of the crank arms 12 and 13.

While a preferred embodiment of the invention has been described using specific terms, such description is for illustrative purposes only, and it is to be understood that changes and variations may be made without departing from the spirit and scope of the invention which is defined in the following claims.

What is claimed is:

1. A gear crank comprising a crank having a crank shaft and a pair of crank arms fixed to both axial ends of said crank shaft, and an adapter supporting an annular chain gear solely, said adapter providing the only support for said chain gear and supporting said chain gear through two groups of stays each group having two stays, said stays of each of said groups being positioned rearwardly with respect to a respective one of said corresponding crank arms in the drive-revolving direction thereof, a stay closest to each crank arm being positioned at an angle of 40 to 60 degrees with respect thereto, said stays in each group being positioned an an angle of 50 to 60 degrees with respect to each other, said stays of each group being disposed in a range wherein a torque acting on each of said crank arms becomes a maximum after each of said crank arms revolves to pass an upper dead point therefor, said chain gear being smaller in cross sectional area at a portion thereof corresponding in location to the position of the crank arms than at a portion thereof located between the stays in each group.

2. A gear crank according to claim 1, wherein each of said stays is twisted with respect to the general plane of said chain gear so as to be displaced, at the front side in the drive-revolving direction of said stay, away from said crank arm at the chain gear supporting side, and at the rear side toward said crank arm.

3. A gear crank according to claim 2, wherein each of said stays is oblong in cross section with opposite long sides and opposite short sides being of a circular arc, said long sides being oriented in the same direction as the drive-revolving direction of said chain gear.

4. A gear crank according to claim 3, wherein each of said stays, at both ends of said opposite long sides in cross section, is tapered endwise.

5. A gear crank according to claim 1, wherein each of said stays is oblong in cross section with opposite long sides and opposite short sides being of a circular arc, said long sides being oriented in the same direction as the drive revolving direction of said chain gear.

6. A gear crank according to claim 5, wherein each of said stays, at both ends of said opposite long sides in cross section, is tapered endwise.

7. A gear crank according to any one of claims 1, 5 or 6, wherein each of said crank arms is streamlined in cross section so that the front side in the drive-revolving direction of said crank arm is made round, said crank arms tapering rearwardly from said front side.

* * * * *